US009886600B2

(12) United States Patent
Beals

(10) Patent No.: US 9,886,600 B2
(45) Date of Patent: Feb. 6, 2018

(54) SMART CARD READER WITH ELECTROSTATIC DISCHARGE PROTECTION

(71) Applicant: EchoStar Technologies L.L.C., Englewood, CO (US)

(72) Inventor: William Michael Beals, Englewood, CO (US)

(73) Assignee: ECHOSTAR TECHNOLOGIES L.L.C., Englewood, CO (US)

(*) Notice: Subject to any disclaimer, the term of this patent is extended or adjusted under 35 U.S.C. 154(b) by 7 days.

(21) Appl. No.: 14/981,012

(22) Filed: Dec. 28, 2015

(65) Prior Publication Data

US 2017/0185810 A1 Jun. 29, 2017

(51) Int. Cl.
G06K 7/00 (2006.01)
G06K 19/077 (2006.01)

(52) U.S. Cl.
CPC ......... *G06K 7/0056* (2013.01); *G06K 7/0082* (2013.01); *G06K 19/07743* (2013.01)

(58) Field of Classification Search
USPC ....................................................... 235/441
See application file for complete search history.

(56) References Cited

U.S. PATENT DOCUMENTS

| 5,892,216 A * | 4/1999 | Grant ................... G06K 7/0082 235/441 |
| 6,318,632 B1 | 11/2001 | Grant et al. |
| 8,544,743 B2 * | 10/2013 | Hong ................... G06K 7/0082 235/441 |
| 9,391,406 B2 * | 7/2016 | Pavageau ............. G06K 7/0082 |
| 2005/0047096 A1 | 3/2005 | Wakabayashi et al. |

FOREIGN PATENT DOCUMENTS

WO 95/14288 5/1995

* cited by examiner

Primary Examiner — Michael G Lee
Assistant Examiner — David Tardif
(74) Attorney, Agent, or Firm — Seed IP Law Group LLP

(57) ABSTRACT

Various embodiments provide a smart card reader that includes a smart card reader body and smart card contacts. The smart card reader body is a single, contiguous piece of electrically dissipative material. As a smart card is inserted in to the smart card reader body and makes contact with portions of the smart card reader body, any electrostatic charge that has accumulated on plastic portions of the smart card is discharged through the smart card reader body itself, and to ground. As a result, damage to circuitry coupled to the smart card reader and an embedded circuit housed in the smart card is avoided.

14 Claims, 6 Drawing Sheets

SMART CARD READER WITH ELECTROSTATIC DISCHARGE PROTECTION

BACKGROUND

Technical Field

The present disclosure is directed to electrostatic discharge protection for a smart card reader.

Description of the Related Art

A smart card, also known as a chip card or an integrated circuit card, refers to a card that houses an embedded circuit capable of providing various applications, such as identification, authentication, and data storage. Signals of the embedded circuit are brought to a surface of the smart card by electrically coupling the embedded circuit to a number of contact pads on the surface of the smart card. Most smart cards have eight contact pads. Generally, six of the contact pads are defined: VCC, GND, Reset, Clock, Vpp, and Serial Data I/O, while two are reserved for future use.

A smart card reader includes a number of terminals electrically coupled to internal circuitry of a housing. When a smart card is fully inserted in to the smart card reader, the terminals contact the contact pads of the smart card, and, as a result, electrically couple the internal circuitry of the housing to the embedded circuit of the smart card.

Smart cards and set top box circuitry coupled to smart card readers are particularly vulnerable to electrostatic discharge. Smart cards are generally made of plastic, and, as is known, electrostatic charge can accumulate on plastic. For example, if a person walks on carpet and then handles a smart card, an electric charge may accumulate on the plastic portions of the smart card. Consequently, when the smart card is inserted in to the smart card reader and comes into contact with the terminals of the smart card reader, an electric arc may occur and damage the embedded circuit of the smart card and internal circuitry of the housing. As such, electrostatic discharge protection is needed to prevent damage to the embedded circuit of the smart card and the internal circuitry of the housing. Current methods typically utilize standard circuits, such as diodes and capacitors, to discharge an electrostatic charge. However, such methods are costly because an individual electrostatic discharge circuit is needed for each terminal of the smart card reader. Further, it is contemplated that smart cards that require more than the conventional eight contact pads will eventually be employed. As the number of smart card contact pads increases from eight to twelve, for example, adding a custom, dedicated electrostatic discharge protection circuit for each terminal of a smart card reader becomes costly and impractical.

BRIEF SUMMARY

The present disclosure provides a smart card reader with electrostatic discharge protection.

According to one embodiment, the smart card reader includes a smart card reader body and smart card contacts. The smart card reader body is a single, contiguous piece of electrically dissipative material. As a smart card is inserted in to the smart card reader body and makes contact with portions of the smart card reader body, any electrostatic charge that has accumulated on plastic portions of the smart card is discharged through the smart card reader body itself, and to ground. As a result, damage to circuitry coupled to the smart card reader and an embedded circuit housed in the smart card is avoided.

According to one embodiment, the smart card reader body includes a support portion, a press-bar, retention clips, guide members, and engaging members.

According to one embodiment, the entire smart card reader body is dipped in a slightly conductive coating.

According to one embodiment, the smart card reader body is made of plastic with conductive material embedded in the plastic itself.

According to one embodiment, the smart card reader body, or portions thereof that make contact with the smart card, is sprayed with a thin layer of dissipative material after the smart card reader body 30 has been made.

The smart card reader disclosed herein results in a smart card reader that provides electrostatic discharge protection without individual electrostatic discharge protection circuits for each smart card contact.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings.

DETAILED DESCRIPTION

Figure 1:
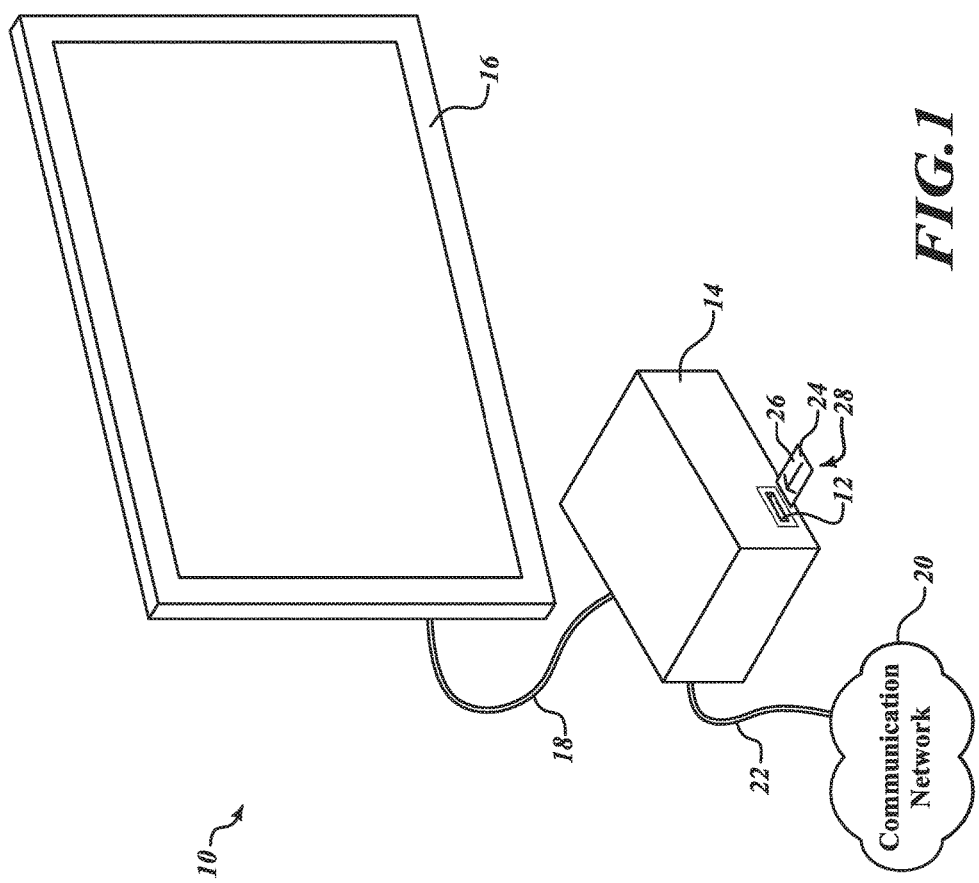
FIG. 1 is a system that includes a smart card reader according to one embodiment as disclosed herein.

In the following description, certain specific details are set forth in order to provide a thorough understanding of various embodiments of the disclosure. However, one skilled in the art will understand that the disclosure may be practiced without these specific details. In some instances, well-known details associated with electrostatic discharge have not been described to avoid obscuring the descriptions of the embodiments of the present disclosure.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the drawings, identical reference numbers identify similar features or elements. The size and relative positions of features in the drawings are not necessarily drawn to scale.

FIG. 1 is a system 10 that includes a smart card reader 12 according to principles disclosed herein. The system 10 includes a set-top box 14 coupled to a display device 16 over a first cable 18 and to a communication network 20 over a second cable 22. The system 10 includes the smart card reader 12 configured to receive and read a smart card 24. The smart card 24 has a first side 26 and a second side 28. The second side 28 includes contact pads that are electrically coupled to an embedded circuit housed within the smart card 24.

The set-top box 14 is configured to receive program content transmitted from a content service provider over the communication network 20 and output the program content to the display device 16. The program content may be in the form of video, audio, data, multimedia, or another form appropriate for transmission over the communication network 20.

The communication network 20 facilitates the transmission of program content from the content service provider to the set-top box 14. The communication network 20 may include any type of wired or wireless communication system, such as satellite, antenna, cable, and servers, in their associated network topologies. In one embodiment, the content service provider is a direct broadcast satellite service provider transmitting content over a satellite communication network that includes antennas and satellites.

Figure 2:
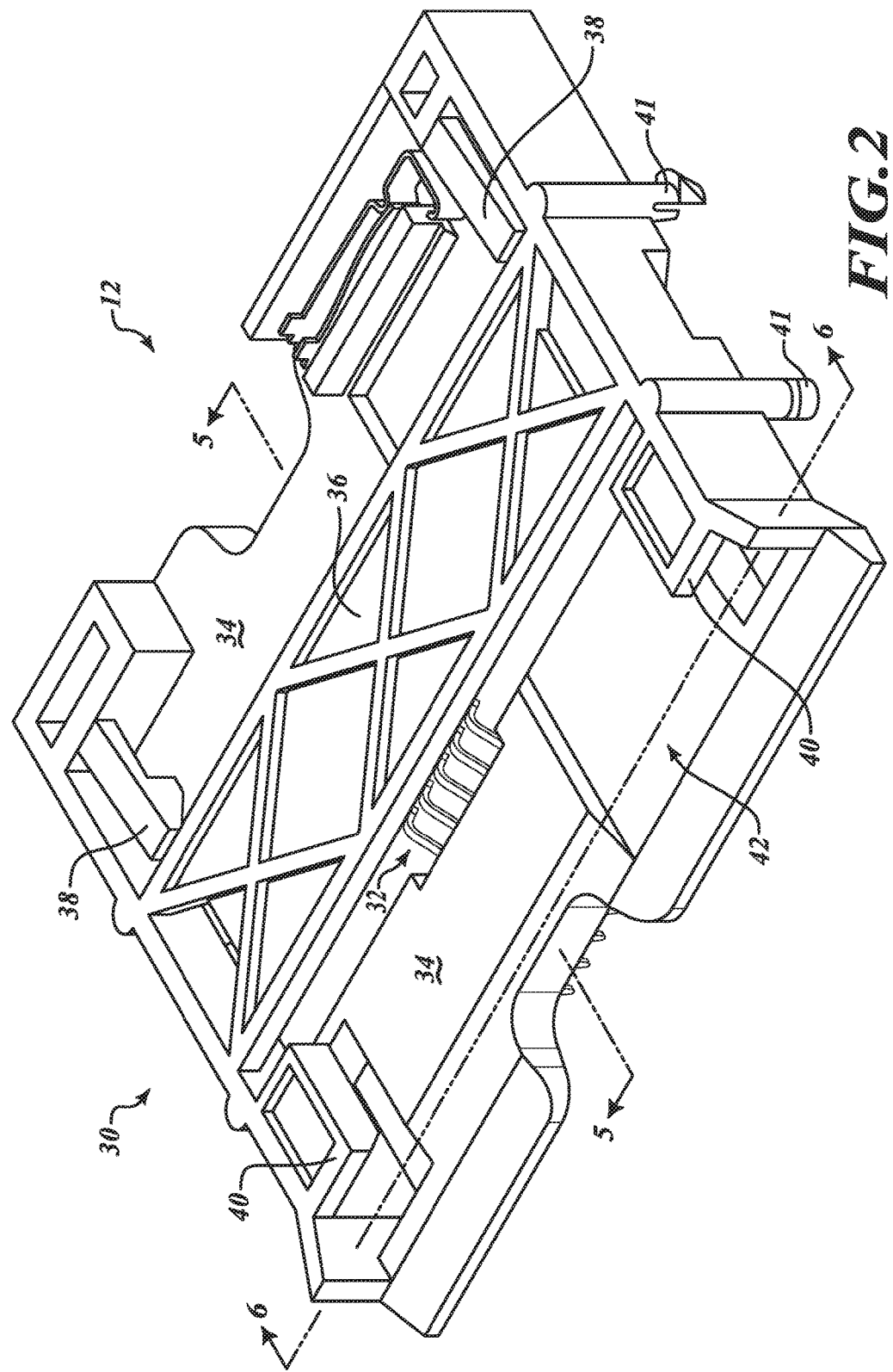
FIG. 2 is a simplified angled view of a smart card reader according to one embodiment as disclosed herein.

FIG. 2 is a simplified angled view of the smart card reader 12 according to principles disclosed herein. The smart card reader 12 includes a smart card reader body 30 and smart card contacts 32.

Figure 3:
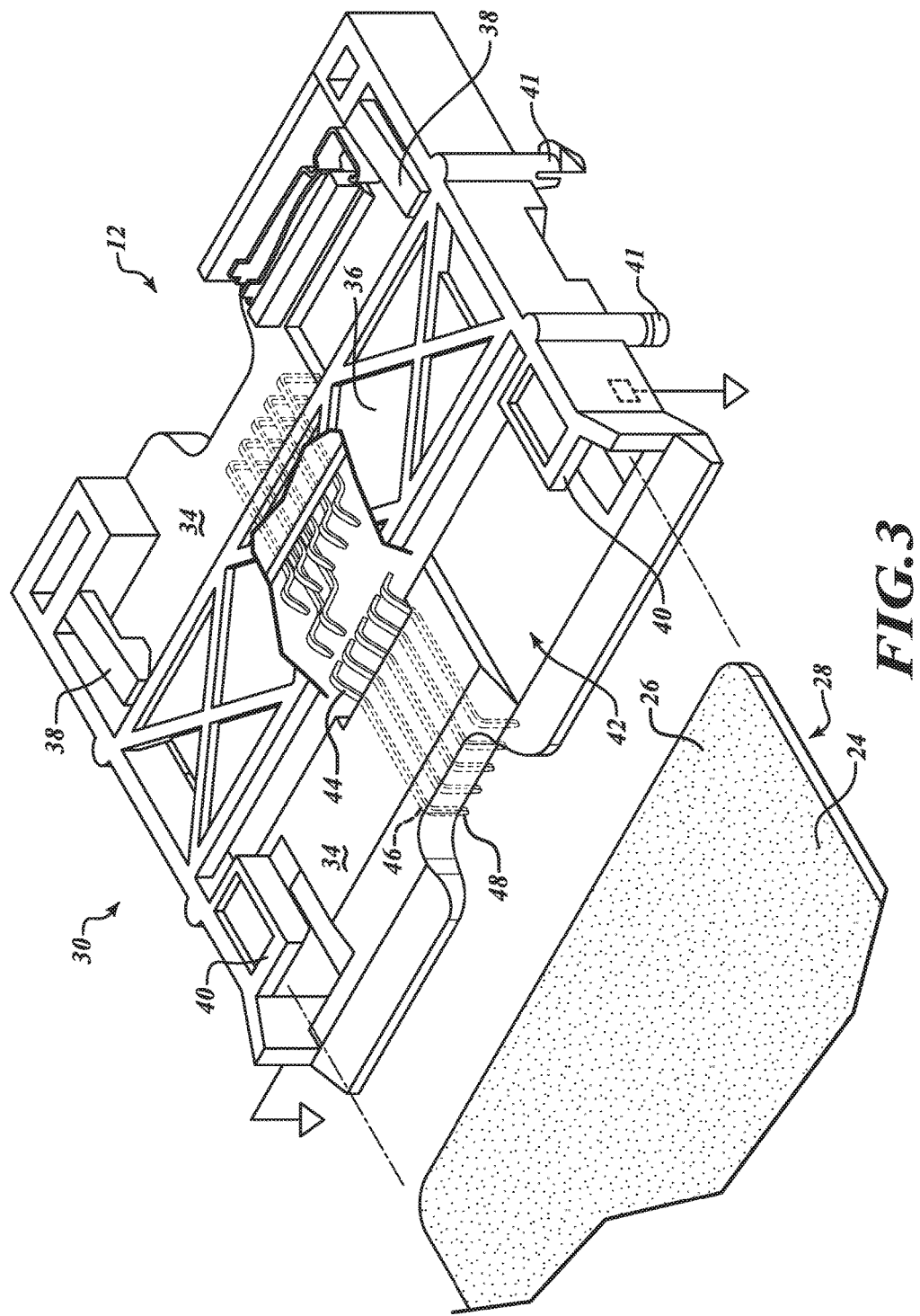
FIG. 3 is a simplified angled view of a smart card reader with a portion of its body shown in cut away and a smart card positioned to be inserted according to one embodiment disclosed herein.
Figure 4:
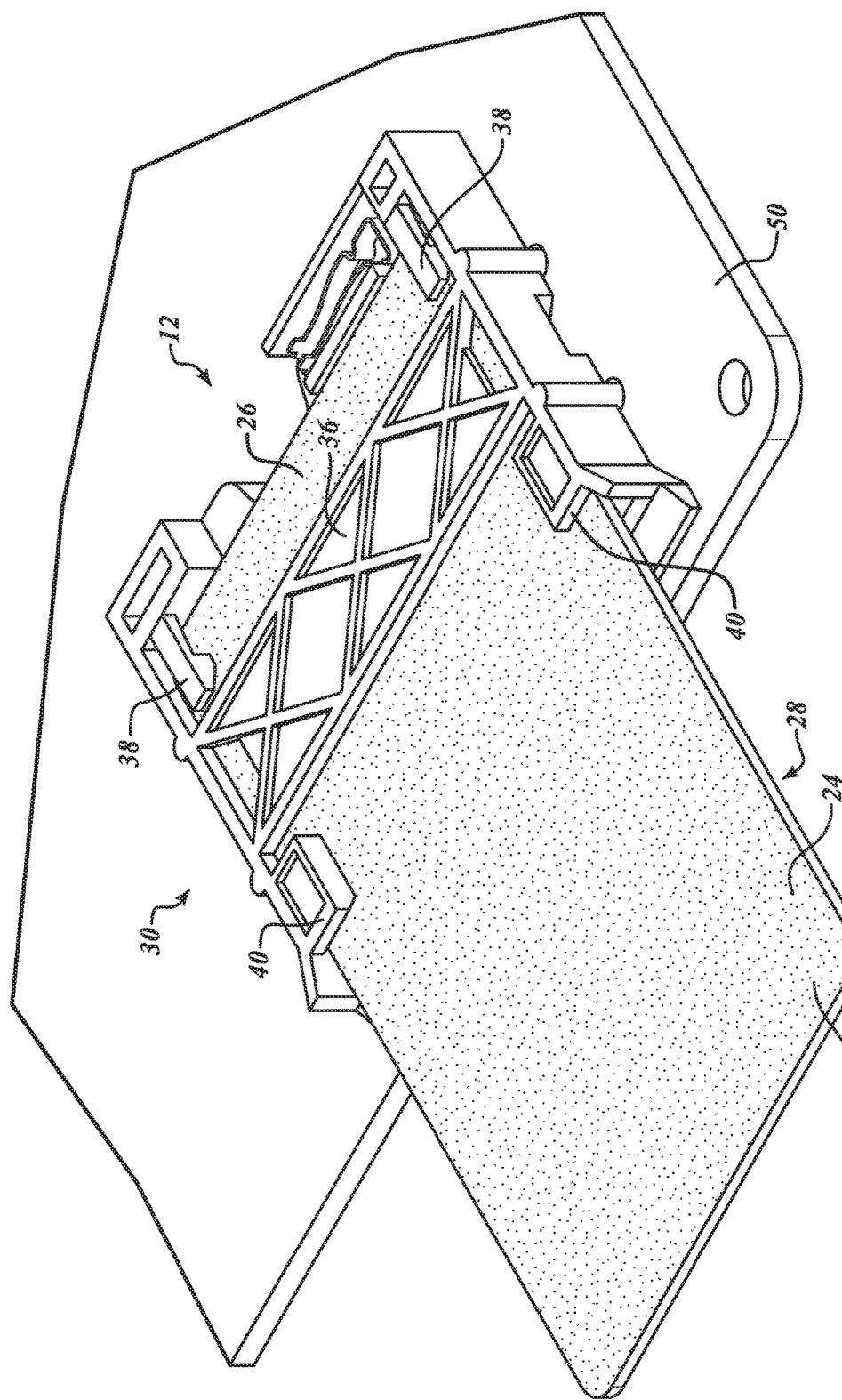
FIG. 4 is a simplified angled view of a smart card reader mounted on a circuit board and a smart card inserted in to the smart card reader according to one embodiment disclosed herein.
Figure 5:
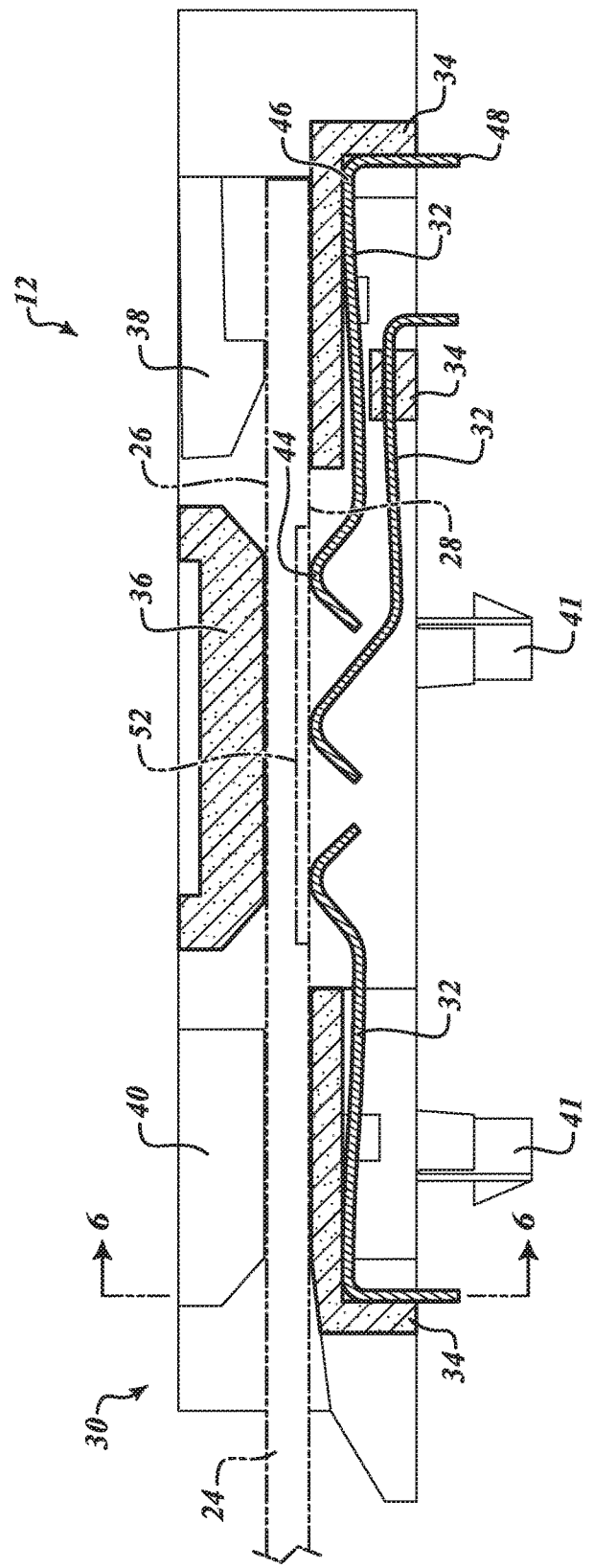
FIG. 5 is a first simplified cross-sectional view of a smart card reader with a smart card inserted according to one embodiment disclosed herein.
Figure 6:
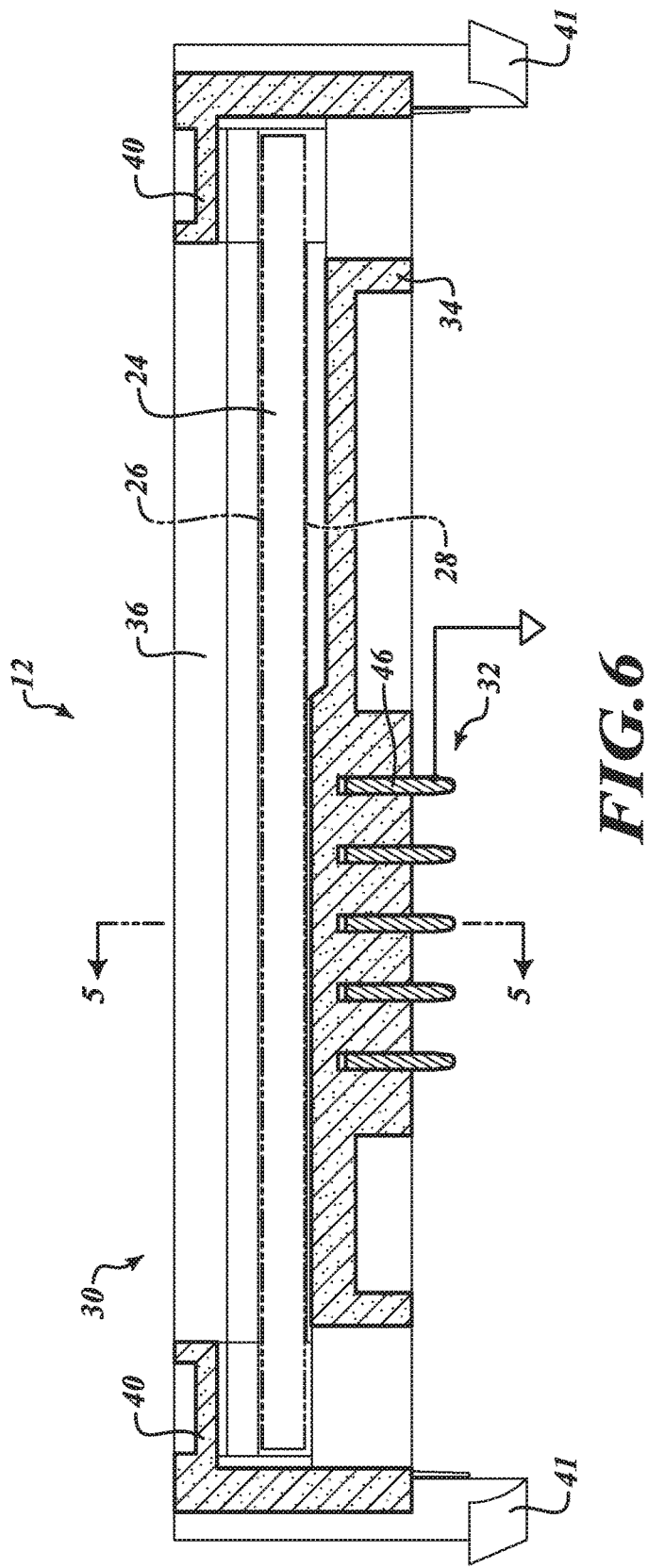
FIG. 6 is a second simplified cross-sectional view of a smart card reader with a smart card inserted according to one embodiment disclosed herein.

It is beneficial to review FIG. 2 simultaneously with FIGS. 3-6. FIG. 3 is a simplified angled view of the smart card reader 12 with a portion of a press-bar 36 of the smart card reader body 30 cut away, and the smart card 24. FIG. 4 is a simplified angled view of the smart card reader 12 mounted on a circuit board 50 and the smart card 24 inserted in to the smart card reader body 30. FIG. 5 is a first simplified cross-sectional view along axis 5 shown in FIG. 2 of the smart card reader 12 with the smart card 24 inserted. FIG. 6 is a second simplified cross-sectional view along axis 6 shown in FIG. 2 of the smart card reader 12 with the smart card 24 inserted.

The smart card reader body 30 is a single, contiguous piece and is coupled to ground. In one embodiment, the smart card reader body 30 is coupled to the ground of the circuit board 50. In another embodiment, the smart card reader body 30 is grounded to the housing 14. As will be discussed in further detail below, the smart card reader body 30 is made of an electrically dissipative material.

The smart card reader body 30, as shown in FIG. 2, includes a support portion 34, a press-bar 36, retention clips 38, guide members 40, and engaging members 41.

The support portion 34 provides a base for smart card reader body 30. The support portion 34, as shown in FIGS. 4 and 5, is configured to support the smart card 24 when it is inserted into smart card reader body 30. In addition, the support portion 34 secures the smart card contacts 32. Particularly, referring to FIGS. 5 and 6, the support portion 34 simultaneously holds each of the smart card contacts 32 in fixed positions such that the smart card contacts 32 touch contact pads 52 of the smart card 24 when fully inserted.

The press-bar 36 is configured to make physical contact with the first side 26 of the smart card 24 when inserted. As shown in FIG. 4, the press-bar 32 overlies the contact pad 52 and smart card contact portions 44 of the smart card contacts 32 to ensure a proper electrical connection is made between the smart card contacts 32 and the contacts pads 52 when the smart card 24 is inserted.

The retention clips 38 are configured to apply a physical force on the smart card 24 when inserted. Particularly, as shown in FIG. 4, the retention clips 38 apply a downward force on to the first side 26 of the smart card 24 to ensure that the smart card 24 remains stationary.

The guide members 40 guide an insertion of the smart card 24. The support portion 34 and the guide members 40, together, form a slot 42 that receives the smart card 24. That is, referring to FIGS. 3 and 4, the smart card 24 is inserted between the guide members 40 and the support portion 34.

The engaging members 41 are used to mount the smart card reader body 30 to the circuit board 50. Particularly, as shown in FIG. 4, the engaging members 41 are inserted in to respective receptacles of the circuit board 50.

The smart card contacts 32 are configured to create electrical connections with the contact pads 52 of the smart card 24. As shown in FIGS. 3 and 5, each of the smart card contacts 32 includes a smart card contact portion 44, a mounting portion 46, and a circuit board contact portion 48. The smart card contact portion 44 is configured to contact the contact pads 52 on the second side 28 of the smart card 24 to create an electrical connection. The mounting portion 46, as shown in FIGS. 5 and 6, is secured by the support portion 34. Namely, as previously discussed, the support portion 34 simultaneously holds each of the smart card contacts 32 by their respective mounting portions 46 in fixed positions such that the smart card contacts 32 touch contact pads 52 of the smart card 24 when inserted. The circuit board contact portion 48 is configured to contact a pad of a circuit board to create an electrical connection.

It should be noted that, although twelve smart card contacts in adjacent rows are shown in the embodiments of FIGS. 2-6, there may be any number of smart card contacts, and the smart card contacts may have any configuration.

The smart card contacts 32 may be formed using techniques now known or later developed. For example, the smart card contacts 32 may be formed by stamping a flat sheet of conductive material using a forming press. Conductive materials may include materials commonly used for electrical contacts, such as copper, aluminum, tungsten, silver, gold, titanium, platinum, tantalum, or combinations thereof. A preferred material is a copper alloy. The smart card contacts 32 may also have gold plating on the contact portions.

As previously discussed, the smart card reader body 30 is a single, contiguous piece. In particular, the entire smart card reader body 30 is made of a single piece that has an exposed surface made of electrically dissipative material. Generally, electrically dissipative materials are slightly conductive, but mostly resistive. As a result, in contrast to conductive and resistive materials, dissipative materials allow electrical charges to discharge to a ground in a slow and controlled fashion. Generally, dissipative materials have a surface resistivity between $1 \times 10^6$ Ω per square and $1 \times 10^{12}$ Ω per square, or a bulk volume resistivity between of $1 \times 10^5$ Ω per centimeter and $1 \times 10^{11}$ Ω per centimeter.

The use of dissipative material provides electrostatic discharge protection against an electrostatic discharge event, which is usually measured in the thousands or hundreds of thousands of volts. Namely, as the smart card 24 is inserted in to the slot 42 and makes contact with the support portion 34 and the guide members 40, and eventually the press-bar 36, any electrostatic charge that has accumulated on the plastic portions of the smart card 24 is discharged through the smart card reader body 30 itself, and to ground. As a result, damage to internal circuitry of the set top box 14 and the embedded circuit housed in the smart card 24 is avoided.

As discussed with respect to FIGS. 2-6, the smart card reader body 30, specifically the support portion 34, is in mechanical and electrical contact to secure all of the smart card contacts 32. Accordingly, the dissipative material of the smart card reader body 30 should have a resistivity that is large enough that electrical signals from the smart card 24 will not be degraded by being dissipated through the smart card reader body 30, or shorted out between two adjacent smart card contacts 32. In addition, the dissipative material of the smart card reader body 30 should have a resistivity that is small enough to discharge any electrostatic charge that is accumulated on the plastic portions of the smart card 24 before an electric arc occurs. Further, the resistivity of the dissipative material of the smart card reader body 30 must be large enough to prevent power drainage as the smart card reader body 30 is coupled to ground. That is, there should only be a small trickle current from all of the smart card contacts 32 to ground. In a preferred embodiment, the body 32 has a bulk resistivity between 5 mega ohms per centimeter and 50 mega ohms per centimeter.

As can best be seen in FIG. 6, all of the electrical contacts 46 that extend from the smart card to the circuit board are mechanically held in the smart card reader body 30 and, in particular, in the support portion 34. As a result of this mechanical connection, each of the smart card contacts 32 are also electrically connected to each other via the support portion 34. This has the particular advantage that no static discharge can build up between them. In the event of a high voltage being placed on any one of the smart card contacts 32 or adjacent to the smart card reader body 30, it will be immediately dissipated and carried to ground because the smart card reader body 30 has an exposed surface of electrically dissipative material. Accordingly, if a smart card or the hand of a person holding the smart card has an electrostatic charge on it, as it is placed into the smart card reader as shown in FIGS. 3 and 5, the charge whether on the card or the finger of the user will spread to the smart card reader body 30 and from there will be routed to ground via the ground contact of the smart card reader body 30.

A disadvantage of having each of the electrical contacts 32 electrically coupled to each other is that the electrical signals on each of them will have a tendency to merge. As can be appreciated, one of the smart card contacts will be a positive electrical power, another of the contacts will be ground, while other of the contacts will be various electrical signals that may include encoder pins, the passing of digital encryption keys, and, for a sophisticated smart card, will also include the passing of the audio and video data signals themselves. Accordingly, if the conductivity of the smart card reader body 30 is too low, the signals will all be connected to power or ground and, therefore, the data will be lost. Accordingly, in order to avoid the loss of the signal values, the resistivity of the smart card reader body 30 is made sufficiently high that the integrity of the signals is maintained. For example, if the resistivity of the smart card reader body 30 is in excess of 10 mega ohms per centimeter, then each of the individual signals on each individual pin will have sufficient strength as it passes between the smart card 24 and the chips on the circuit board such that the data in the signal that is carried on the contact 32 remains the same and the integrity of the electrical signal is maintained. Thus, for low voltage signals in the range of 12 volts or less, there is not much dissipation of the current and the voltage that is placed on each pin will remain generally at its starting value. There is sufficient resistivity between the data pins and the ground pin and the power pin that each of them maintains their electrical integrity for low voltage signals, such as 12 volts or less. On the other hand, if a high voltage signal, of the electrostatic type, which are generally in the range of many thousands or hundreds of thousands of volts, is applied, the resistivity is sufficiently low that the electrostatic charge will be immediately dissipated through to ground.

There are at least two separate ways that the electrostatic charge is provided through to ground. According to a first embodiment, the body itself may be coupled directly to ground as shown in FIG. 3. In this instance, at least one and preferably multiple places on the smart card reader body 30 are connected via metal connections to a ground plate either inside the set top box or on the printed circuit board. Thus, any electrostatic charge on the body 30 is immediately dissipated through to ground. Alternatively, it is also possible that the electrostatic discharge occurs solely through the ground pin of smart card contacts 32. In particular, as best shown in FIGS. 5 and 6, one of the smart card contacts 32 will be electrically coupled to ground on both the circuit board and the smart card 24. When electrostatic charge occurs on the smart card reader body 30, it will travel via the support portion 34 to the particular ground pin 32 and, thus, be grounded via the printed circuit board. For some applications, the use of grounding solely through the smart card contact 32 that is coupled to ground will be acceptable. In other embodiments, a ground is coupled to both a particular smart card contact 32 and also to the smart card reader body 30 itself. Thus, the electrostatic voltage can be dissipated through both routes simultaneously.

There are a number of ways to achieve the dissipative material of the smart card reader body 30. In one embodiment, the entire smart card reader body 30 is dipped in a slightly conductive coating. In another embodiment, the smart card reader body 30 is made of plastic with conductive material embedded in the plastic itself. In a further embodiment, the smart card reader body 30, or portions thereof that make contact with the smart card 24, is sprayed with a thin layer of dissipative material after the smart card reader body 30 has been made. It should be noted that such a spray-on layer will typically rub off after numerous insertions and removals of the smart card 24. However, in the environment shown in FIG. 1, the smart card 24 will likely only be inserted and removed a few times in the life of the product. As such, the spraying of dissipative material is possible because the constant insertion and removal of the smart card 24, which may cause gradual removal the conductive spray, is not a factor.

The smart card reader 12 disclosed herein results in a smart card reader that provides electrostatic discharge protection without individual electrostatic discharge protection circuits for each smart card contact.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A set-top box, comprising:
a housing;
a circuit board positioned within the housing;
a smart card reader body including a slot configured to receive a smart card, the smart card including a first surface, a second surface that is opposite to the first surface, and side surfaces, the smart card including a contact pad on the first surface of the smart card, the smart card reader body including:
  a base that is an integral portion of the smart card reader body, the base being positioned to contact the first surface of the smart card when the smart card is inserted into the slot of the smart card reader body;
  sidewalls that are integral portions of the smart card reader body, the sidewalls being directly attached to the base, the sidewalls being positioned lateral to the side surfaces of the smart card when the smart card is inserted into the slot of the smart card reader body;
  guide members that are integral portions of the smart card reader body, the guide members overlying the base and being directly attached to the sidewalls, the guide members being positioned to contact the second surface of the smart card when the smart card is inserted into the slot of the smart card reader body, the slot of the smart card reader body being formed by the base, the sidewalls, and the guide members;
  retention clips that are integral portions of the smart card reader body, the retention clips overlying the base and being directly attached to the sidewalls, the retention clips being positioned to contact and apply a force on the second surface of the smart card when the smart card is inserted into the slot of the smart card reader body; and
  a press bar that is an integral portion of the smart card reader body, the press bar overlying the base and being directly attached to the sidewalls, the press bar being positioned between the guide members and the retention clips, the press bar being positioned to contact the second surface of the smart card when the smart card is inserted into the slot of the smart card reader body, the base being spaced from the guide members, the retention clips, and the press bar by the smart card when the smart card is inserted into the slot of the smart card reader body, the base, the sidewalls, the guide members, the retention clips, and the press bar being a single contiguous piece that is composed of electrically dissipative material having a surface resistivity between $1\times10^6$ ohms per square and $1\times10^{11}$ ohms per square;
a plurality of smart card contacts, each of the plurality of smart card contacts including a circuit board contact portion electrically coupled to the circuit board, a mounting portion that is mechanically and electrically coupled to the base of the smart card reader body, and a smart card contact portion positioned to make an electrical connection with the contact pad on the first surface of the smart card when the smart card is inserted into the slot of the smart car reader body, the press bar directly overlying and aligned with the smart card contact portions of the plurality of smart card contacts; and
a ground pin mechanically and electrically coupled to the base of the smart card reader body, the plurality of smart card contacts and the ground pin being electrically connected to each other through the base of the smart card body, the ground pin being positioned to contact the first surface of the smart card when the smart card is inserted into the slot of the smart card reader body.

2. The set-top box of claim 1, wherein the electrically dissipative material has a bulk volume resistivity within the range of $1\times10^5 \Omega$ per centimeter to $1\times10^{11} \Omega$ per centimeter.

3. The set-top box of claim 1, wherein the smart card reader body is covered with an electrically dissipative conductive coating.

4. The set-top box of claim 1, wherein the smart card reader body has a resistivity between 5 mega ohms per centimeter and 50 mega ohms per centimeter.

5. The set-top box of claim 1, wherein the ground pin and four smart card contacts of the plurality of smart card contacts are arranged in a first row, five smart card contacts of the plurality of smart card contacts are arranged in a second row, and two smart card contacts of the plurality of smart card are arranged in a third row positioned between the first row and the second row.

6. The set-top box of claim 1, wherein the press bar includes a contacting portion that extends from a first sidewall of the sidewalls to a second sidewall of the sidewalls, the entire contacting portion of the press bar configured to contact the second surface of the smart card, the first sidewall being spaced from the second sidewall by the smart card when the smart card is inserted into the slot of the smart card reader body.

7. The set-top box of claim 1, wherein the base, the sidewalls, the guide members, the retention clips, and the press bar are made of the same electrically dissipative material.

8. A smart card reader device, comprising:
a smart card reader body that is a single contiguous piece made of an electrically dissipative material, the electrically dissipative material having a resistivity between $1\times10^5$ ohms per centimeter and $1\times10^{11}$ ohms per centimeter, the smart card reader body including:
  a base;
  first and second sidewalls directly attached to the base; and
  a press bar directly attached to the first and second sidewalls, the base, the first and second sidewalls, and the press bar forming a slot configured to receive a smart card, the base configured to contact a first surface of the smart card, the press bar configured to contact a second surface, opposite to the first surface, of the smart card, the base, the first and second sidewalls, and the press bar being integral portions of the smart card reader body and made of the electrically dissipative material; and
a plurality of smart card contacts, each of the plurality of smart card contacts including a circuit board contact portion configured to make an electrical connection with a circuit board, a mounting portion physically and electrically coupled to the base of the smart card reader body, and a smart card contact portion positioned to make an electrical connection with a contact pad on the first surface of the smart card.

9. The smart card reader device of claim 8, wherein the smart card reader body is coupled to a ground via a smart card ground electrical contact.

10. The smart card reader device of claim 8, wherein the smart card reader body has a resistivity between 5 mega ohms per centimeter and 50 mega ohms per centimeter.

11. The smart card reader device of claim 8, wherein the press bar extends from the first sidewall, directly over the plurality of smart card contacts, and to the second sidewall, the press bar being a solid piece without any openings.

12. A smart card reader, comprising:
- a smart card reader body having a slot configured to receive a smart card, the smart card reader body being a single contiguous piece, the entire smart card reader body being made of electrically dissipative material, the smart card reader body including:
  - a base formed of a first integral portion of the smart card reader body, the base configured to contact a first surface of the smart card;
  - a press bar formed of a second integral portion of the smart card reader body, the press bar configured to contact a second surface, opposite to the first surface, of the smart card;
  - a first sidewall formed of a third integral portion of the smart card reader body; and
  - a second sidewall formed of a fourth integral portion of the smart card reader body, the base being spaced from the press bar by the first sidewall and the second sidewall;
- a plurality of smart card contacts mechanically and electrically coupled to the base of the smart card reader body, each of the plurality of smart card contacts configured to make an electrical connection with a circuit board and with a contact pad on the first surface of the smart card; and
- a ground pin mechanically and electrically coupled to the smart card reader body, the ground pin configured to make an electrical connection with the circuit board and contact the first surface of the smart card.

13. The smart card reader of claim 12, wherein the smart card reader body has a resistivity between $1 \times 10^5$ ohms per centimeter and $1 \times 10^{11}$ ohms per centimeter.

14. The smart card reader body of claim 12, wherein the press bar is solid piece without any openings, and extends from the first sidewall to the second sidewall.

* * * * *